US008997155B2

(12) United States Patent
Landow et al.

(10) Patent No.: US 8,997,155 B2
(45) Date of Patent: Mar. 31, 2015

(54) LOCALLY STORED ADVERTISEMENTS

(75) Inventors: Kate Megan Carney Landow, Denver, CO (US); David J. Fernandes, Englewood, CO (US); Daniel Overbaugh, Aurora, CO (US); Michael R. Short, Castle Rock, CO (US); Timothy Heckathorn, Larkspur, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1095 days.

(21) Appl. No.: 12/276,192

(22) Filed: Nov. 21, 2008

(65) Prior Publication Data

US 2010/0131975 A1    May 27, 2010

(51) Int. Cl.
| | |
|---|---|
| *H04N 5/445* | (2011.01) |
| *H04H 20/93* | (2008.01) |
| *H04H 20/10* | (2008.01) |
| *H04N 7/173* | (2011.01) |
| *H04N 21/235* | (2011.01) |
| *H04N 21/435* | (2011.01) |
| *H04N 21/4722* | (2011.01) |
| *H04N 21/488* | (2011.01) |
| *H04N 21/81* | (2011.01) |
| *H04N 21/858* | (2011.01) |

(52) U.S. Cl.
CPC ............. *H04H 20/93* (2013.01); *H04H 20/106* (2013.01); *H04N 7/17318* (2013.01); *H04N 21/235* (2013.01); *H04N 21/435* (2013.01); *H04N 21/4722* (2013.01); *H04N 21/4882* (2013.01); *H04N 21/8166* (2013.01); *H04N 21/858* (2013.01)
USPC ........................................................... 725/61

(58) Field of Classification Search
CPC .......... H04N 21/4722; H04N 7/17318; H04N 21/47214; H04N 21/482; H04N 5/44543
USPC ..................................................... 725/32–35
See application file for complete search history.

(56) References Cited

U.S. PATENT DOCUMENTS

| | | | |
|---|---|---|---|
| 6,606,128 B2 * | 8/2003 | Hanafee et al. ............... | 348/563 |
| 7,103,904 B1 * | 9/2006 | Blackketter et al. ............ | 725/32 |
| 7,647,609 B2 * | 1/2010 | Wachtfogel et al. ............ | 725/34 |
| 2003/0163832 A1 * | 8/2003 | Tsuria et al. ................... | 725/135 |
| 2004/0034873 A1 * | 2/2004 | Zenoni ........................... | 725/135 |
| 2005/0097622 A1 * | 5/2005 | Zigmond et al. ............... | 725/135 |
| 2008/0196071 A1 * | 8/2008 | Manthoulis .................... | 725/100 |

* cited by examiner

*Primary Examiner* — Benjamin R Bruckart
*Assistant Examiner* — Anthony Bantamoi
(74) *Attorney, Agent, or Firm* — Ingrassia Fisher & Lorenz, P.C.

(57) ABSTRACT

The present invention is directed to a system and method for providing supplemental content during a broadcast. The supplemental content is provided by the operation of a interactive application resident on a receiver. The interactive application is initiated through a trigger that is received during a otherwise standard broadcast. The trigger includes an interactive prompt that is to be displayed during a particular portion of the broadcast. The prompt including a means for enabling receipt of a user input. The user input may be a request for further information.

14 Claims, 5 Drawing Sheets

LOCALLY STORED ADVERTISEMENTS

FILED OF THE INVENTION

The present invention is directed to systems and methods for providing supplemental content during a broadcast.

BACKGROUND

During a satellite broadcast or other transmission, or while interacting with an application, a service may provide supplemental content that includes information regarding one or more items that are seen during the broadcast. The supplemental content may be provided through an interactive display that includes a prompt that allows a user to request information. These supplemental or additional displays may be, for example interactive advertisements. These interactive ads typically are transferred via a dedicated broadcast that is transmitted from a service provider to a receiver. The interactive ad is enabled by an action taken by a user in response to a prompt displayed during the standard broadcast or in another application. This action results in the supplemental content being sent over a broadcast channel. Often, though not necessarily, the supplemental content is provided to the receiver through an alternative channel, such as another transmission channel. Alternatively, the supplemental content may be transmitted on the same channel and accessed when the user accepts or otherwise initiates the trigger. More particularly, the supplemental content and the standard broadcast content are received on different channels. Accordingly, a user-initiated request for further information results in an action at a decoder or tuner to change the received channel.

This method of providing supplemental content has a number of drawbacks. Firstly, many tuners are reset to the alternative channel that provides the supplemental content. Moreover, bandwidth associated with the communication path must be consumed during a broadcast to provide the supplemental content from the service provider to the receiver. Accordingly, it would be desirable to have a more efficient and less costly method of delivering supplemental content and prompts for requesting further information.

SUMMARY

The present invention is directed to a system and method for providing a user of a broadcast service with additional information regarding items or services that are included in a broadcast. The present invention addresses the above described deficiencies of the prior art by providing supplemental content through one or more interactive applications that are resident on a receiver. The resident interactive applications are launched by a user interaction with a screen prompt portion of a trigger that is sent along with other broadcast content.

In one embodiment, present invention includes a method of displaying interactive content including receiving a broadcast stream having a trigger, the trigger including an interactive prompt; displaying the interactive prompt concurrently with broadcast content of the broadcast stream; and launching an interactive application, in response to a user actuation or selection of the interactive prompt, the interactive application being resident on the receiver; wherein running the interactive application includes displaying supplemental content related to an item included in the broadcast content of the broadcast stream.

In another embodiment, the present invention includes a method of providing content, including sending a broadcast to a receiver, the broadcast having a trigger including a pointer to an interactive application on the receiver; receiving a message from the interactive application running on the receiver, the interactive application running in response to a user input; the message including an address of the user; and sending information to the address of the user.

In still another embodiment, the present invention includes a receiver including a tuner operable to receive a signal; a decoder connected to the tuner and configured to decode the signal into a decoded signal, the decoded signal including at least one interactive application; a storage device connected to the decoder and configured to store the at least one interactive application; and a processor connected to the storage device operable to execute the at least one interactive application in response to a user activation of a trigger; wherein the trigger is received at the receiver during a broadcast.

DETAILED DESCRIPTION

The present invention is directed to a system and method for providing interactive content. In one embodiment, the interactive content includes an interactive advertisement that is activated and displayed in response to a user-initiated action. In activating the interactive ad, a user selects a screen prompt or icon, which may be displayed concurrently with a broadcast advertisement. The interactive content or advertisement is provided by an interactive application resident on a receiver that displays the broadcast ad. The screen prompt is associated with a trigger that is sent to the receiver along with a broadcast. The present invention is discussed herein in connection with advertisements and the display of advertisement content. However, it should be understood that the present invention is additionally applicable to other types of broadcast content such as broadcasts related to weather reports, newscasts, sporting events and/or other content that is typically sent by way of a broadcast service.

Generally, the present invention provides a means for a user to request further information regarding an item that is shown or displayed during a broadcast. In connection with advertising, the present invention may include interactive content, such as a supplemental ad, that is activated by a user selection of a prompt that is displayed concurrently with a broadcast ad. The supplemental ad may provide further description or information regarding an item or service that is advertised in the broadcast ad. Additionally, the supplemental ad may include buttons or other prompts that provide a means for a user to request further information regarding the item. In connection with alternative embodiments of the present invention, a request for information may be made, through an interactive application, for information regarding sporting events and/or other types of content that is provided in a broadcast. In addition to a supplemental or interactive advertisement, the interactive content may include or take the form of any or all of the following: the ability to view video-on-demand or other video segments; the ability to view localized information such as weather, news, local businesses and addresses, and so forth; the ability to view additional product images; the ability to tune to an alternate service; and the ability to set recording timers for an associated digital video recorder. Localized information may be provided based on, for example, a ZIP code associated with the user's account or STB.

Figure 1:
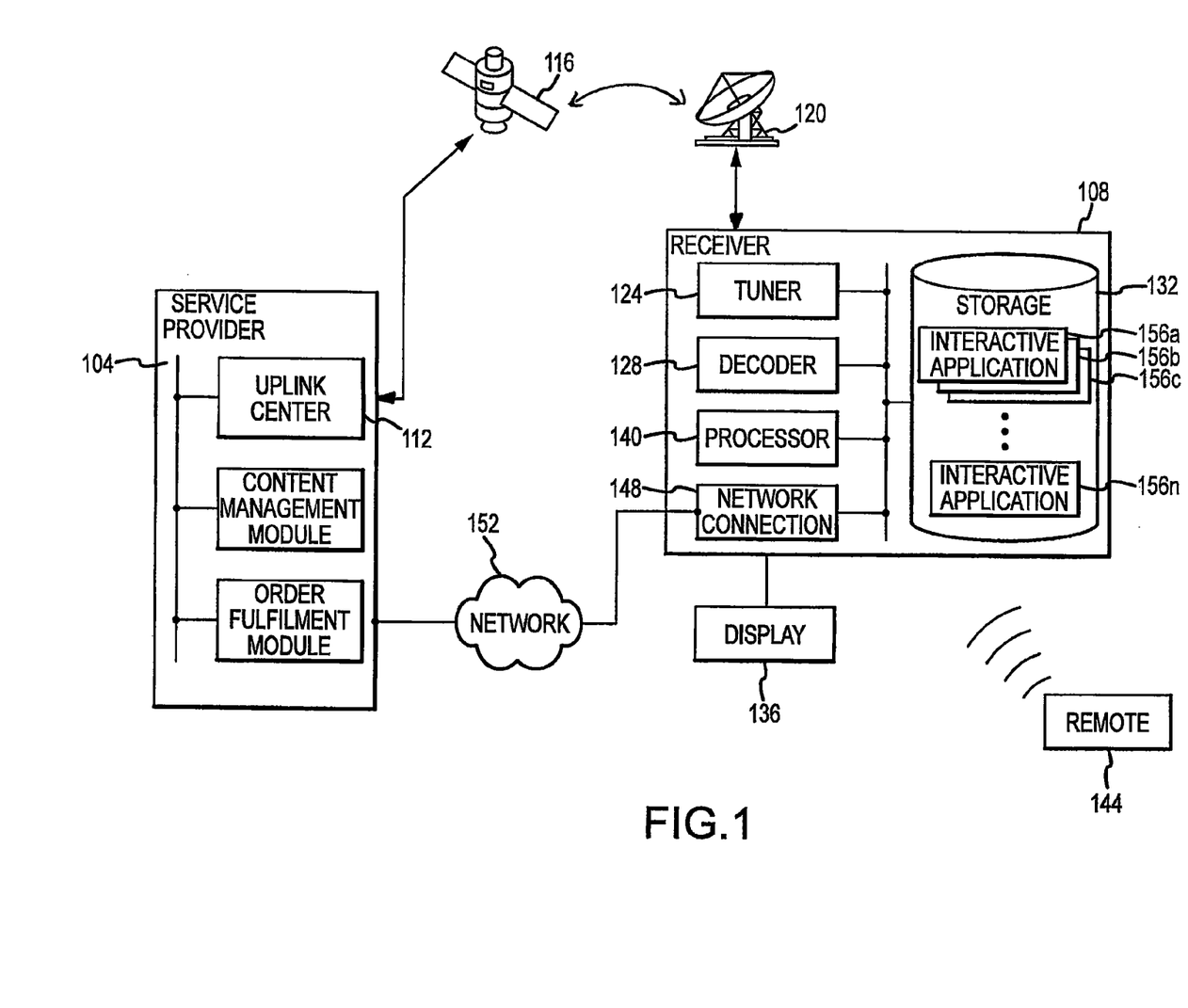
FIG. 1 is a schematic illustration of an operating environment showing component and features of the present invention.

FIG. 1 is a schematic illustration of a general operating environment showing components and features of the present invention. FIG. 1 includes a service provider 104 that transmits or otherwise provides a broadcast to a receiver 108. As used herein, a service provider 104 may include any broadcast service such as, without limitation, a satellite broadcast, a direct television broadcast or a cable television broadcast. The receiver 108 may be associated with an individual and/or a business that receives a broadcast from the service provider 104. The broadcast may be received through a subscription to the service. It should be understood that the term "broadcast" generally embraces not only satellite or terrestrial broadcasts, but also transmission of information across any wired or wireless transmission medium. Accordingly, a "broadcast" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Embodiments of the present invention may operate with a satellite broadcast service. In that regard, the service provider 104 may include an uplink center 112. The uplink center 112 may include a transmitter or other equipment operable to transmit a modulated signal having data representing audio and/or visual content. The modulated signal is received at satellite 116, which in turn rebroadcasts the modulated signal to be received at one or more of terrestrial locations. The rebroadcast signal is received from the satellite 116 at one or more satellite dishes 120, each of which are typically associated with a particular receiver 108. Again, it should be noted that alternative embodiments may operate with different broadcast services. Accordingly, although a satellite system is provided as an example of a broadcast system, it should be understood that other networks or broadcasts for transmitting data may be used by alternative embodiments.

The receiver 108 may include a tuner 124 operable to receive the broadcast signal through the satellite dish 120. The receiver 108 may also include a decoder 128 to decode the received broadcast signal. The decoder 128 may be programmed to decrypt or otherwise decode some or all of the satellite broadcast in accordance with purchases and selections made by a user. A memory or other storage device 132, such as magnetic or optical storage, may additionally be provided to store data received from the decoded satellite signal. The storage device 132 may be located within the receiver 108, or separately from the receiver 108. The stored data set may include audio and/or visual content to be transmitted and displayed through display 136.

The receiver 108 may additionally include a processor 140 operable to run executable code in connection with various functions associated with the receiver 108. In particular, the processor 140 may perform such tasks as executing commands received from a user. User commands may be sent to the receiver 108 through a remote 144 or other wireless device. Such commands sent to the receiver 108 may include, for example, a command to change the broadcast channel or a command to request changes to the broadcast service. Commands sent to the receiver 108 may be entered through a dedicated display menu. In the case of receiving commands or other information relating to changes to the account status, the processor 140 is further operable to send one or more messages to the service provider 104. In this regard, the receiver 108 may additionally include a network connection 148 that provides a connection to network 152. Through the network connection 148 and across the network 152, the receiver 108 may communicate with the service provider 104. In accordance with certain embodiments of the present invention, the receiver 108 and the service provider 104 communicate over standard telephone lines. Here, the network 152 includes the public switched telephony network (PSTN). However, it should be appreciated that the network 152 may include any type of network capable of data communication, such as for example, a local or wide area network or the Internet.

While FIG. 1 includes an illustration of an environment of the present invention that includes a satellite broadcast service, it should be appreciated that alternative embodiments of the present invention may be used in connection with other types of broadcast services. For example, the present invention may be implemented in connection with a cable service. In this case, the service provider 104 and the receiver 108 may communicate over a communication path that includes various combinations of local and wide area networks and/or the Internet.

The present invention includes one or more interactive applications that are resident on the receiver 108. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor. As shown in FIG. 1, the storage 132 includes a plurality of interactive applications 156a-n stored therein. The interactive applications 156a-n reside on the receiver 108 and are run by the processor 104 to display content on the display 136.

Figure 2:
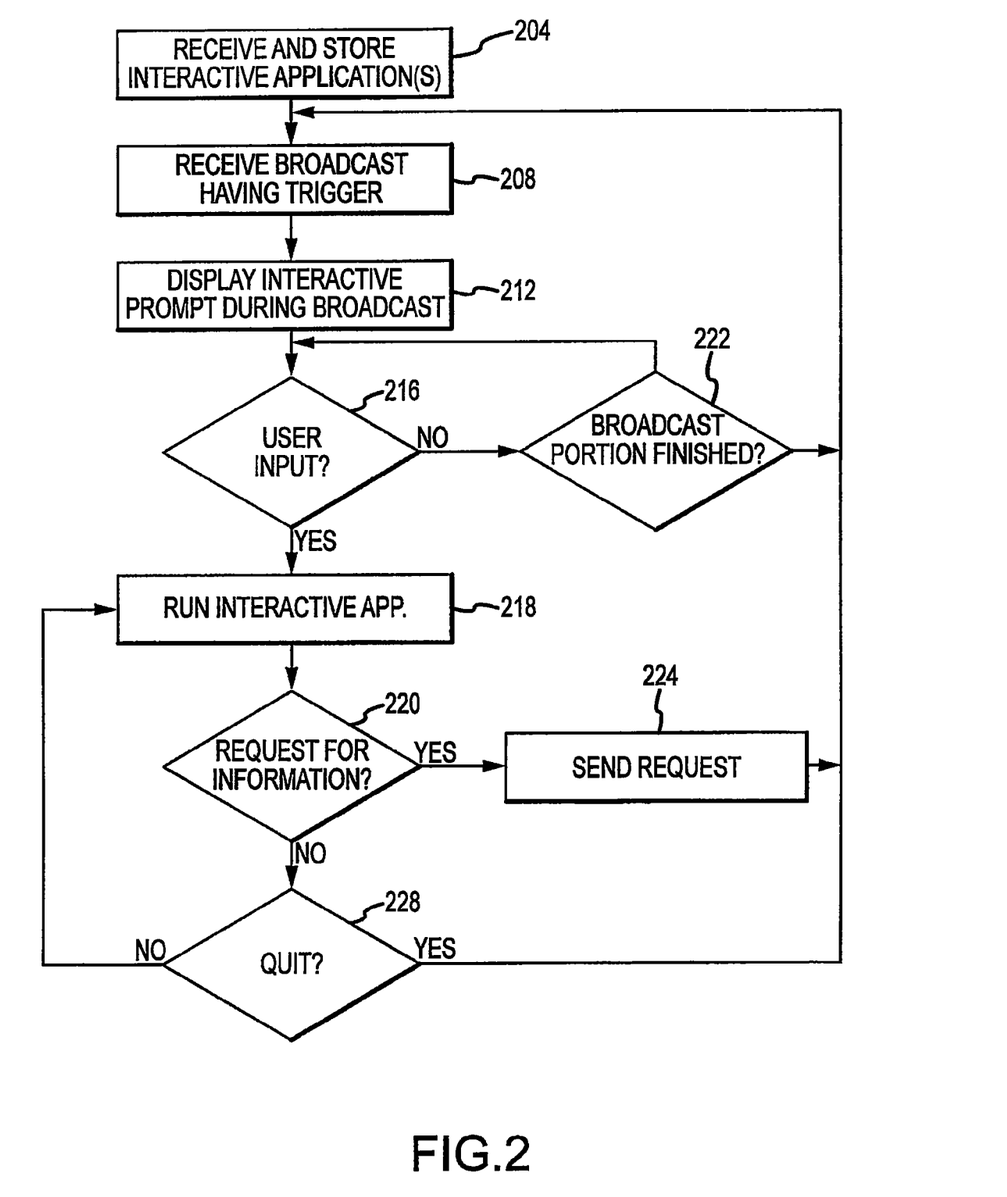
FIG. 2 is a flow chart illustrating a method in accordance with embodiments of the present invention.

Turning now to the operation of a particular interactive application 156a, reference is made to FIG. 2. FIG. 2 includes a flow chart illustrating operations in accordance with a method of the present invention. As mentioned above, one or more interactive applications 156a-n reside on or are otherwise stored locally at the receiver 108. Accordingly, a method in accordance with embodiments of the present invention includes an initial operation 204, wherein the interactive applications 156a-n are received and stored at the receiver 108. Typically, the interactive applications 156a-n are received over the standard broadcast channel from the satellite 116. In particular, the interactive applications 156a-n are sent from the uplink center 112 of the service provider 104 to the satellite 116. From the satellite 116, a broadcast including the interactive applications 156a-n is sent to the satellite dish 120 and then to the receiver 108. The interactive applications 156a-n may be stored in storage 132 for later use.

A particular interactive application 156a may be received alone or in a group that includes other interactive applications 156b-n. In transmitting a group of interactive applications 156a-n, the service provider 104 may compile the applications and compress them into a single file, which is then transmitted from the uplink center 112. In this regard, receiving and storing the interactive applications 156a-n includes, but does not require, decompressing a compressed file at the receiver 108. Each interactive application 156a-n may additionally include a unique identifier. For a particular interactive application 156a, the unique identifier is used by a trigger (described below) to distinguish the interactive application 156a from other interactive applications 156b-n that are retained in the storage 132.

Following receipt and storage of the interactive applications 156a-n in the data storage 132, operation 208 may be executed. In operation 208, the receiver 108 receives a broadcast from the service provider 104. The broadcast typically includes standard broadcast content that is associated with a particular channel provided by the service provider 104. In addition to the standard broadcast content, a trigger is received by the receiver 108. The trigger typically includes computer executable code that is to be executed by the processor 104 during a particular portion of the standard satellite broadcast. As is known in the art, digital data such as computer executable code, may be sent during a broadcast in the Vertical Blanking Interval (VBI) portion of a broadcast. In accordance with embodiments of the present invention, the trigger is at least operable to display an interactive prompt on the display 136 during a predetermined time of the satellite broadcast. The trigger may be computer-executable code or may take the form of a text string that instructs the STB to retrieve and display associated interactive content. (Generally, in such embodiments, the text string is not displayed as part of the interactive content or any associated broadcast.) The trigger may additionally include a unique identifier that correlates the trigger with one of the interactive applications 156a stored in the storage 132. Here, the unique identifier serves as a pointer from the trigger to a particular interactive application 156a. It should be noted that the trigger may be carried in other portions of the broadcast or signal, or may be sent separately therefrom. For example, in one embodiment the trigger may take the form of metadata that is transmitted separately from the video data of a broadcast or otherwise as digital data associated with the broadcast, but not part of any frame or interval of the broadcast's video and/or audio stream.

Figure 3:
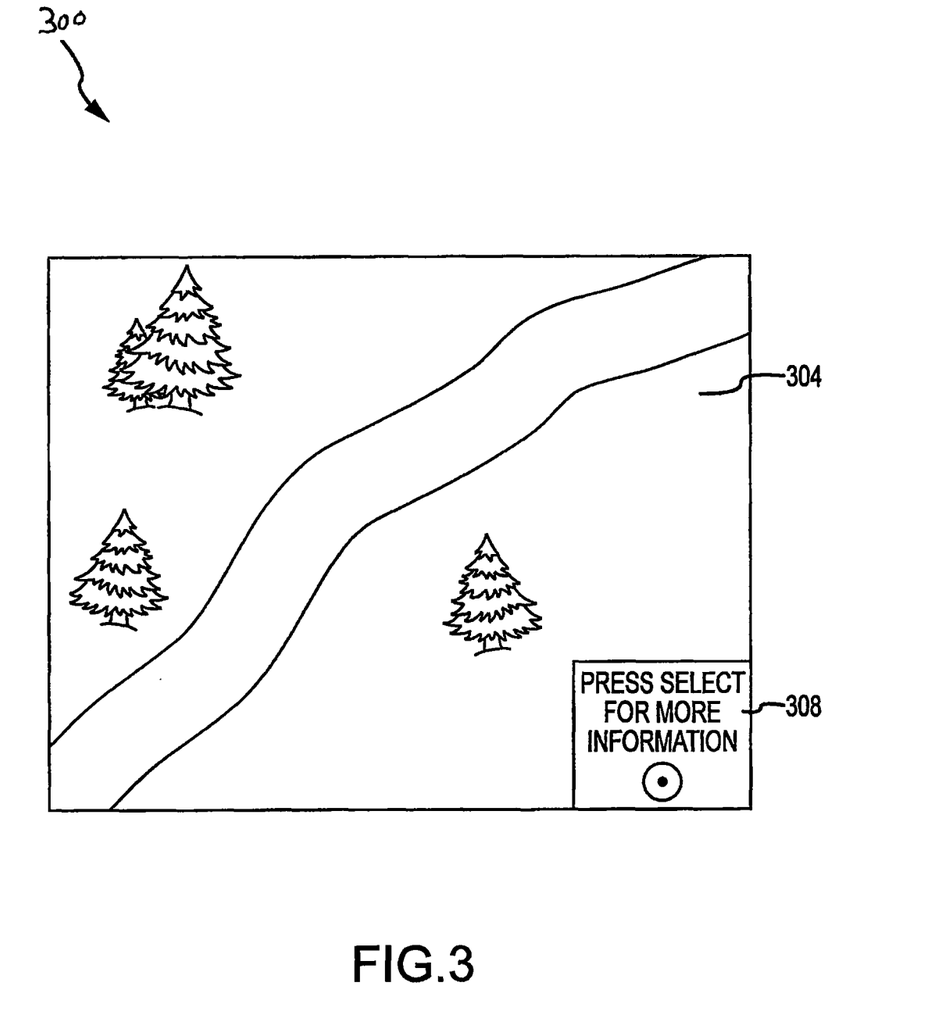
FIG. 3 is a screen shot taken of a display in accordance with embodiments of the present invention.

As a part of operation 212, an interactive prompt is displayed on the display 136. The interactive prompt is associated with the received trigger and is displayed at a predetermined time during the broadcast. An exemplary interactive prompt 308 is shown in FIG. 3. Generally, FIG. 3 shows a frame 300 on the display 136 during a portion of the broadcast. As shown in FIG. 3, the frame 300 includes video content 304 associated with the broadcast. The interactive prompt 308 includes an overlay or pop-up that appears on the display 136 concurrently with the standard video content 304. Typically, an interactive prompt 308 will include a statement urging the user to select or interact with the prompt 308 to view supplemental content. The supplement content may be related to an item or service being shown in the normal video content 304. During display of the interactive prompt 308, a particular button associated with the remote 144 will be enabled, such as a "select" button. By a user pressing, selecting or otherwise actuating the enabled remote button, the trigger that is associated with the interactive prompt 308 will activate. Alternatively, the interactive prompt 308 may be selected using other known techniques, such as for example, mouse clicks, keystrokes or interactions with a touchscreen.

Referring again to FIG. 2, at decision 216, a determination is made by the receiver 108 as to whether input was received from the user. If, as described above, the user presses, selects or otherwise actuates the enabled remote 144 button, then operation 218 will follow. In operation 218, the embodiment launches a particular interactive application 156a that is resident on the receiver at storage 132. The interactive application 156a is chosen from the group of interactive applications 156a-n by the unique identifier that it shares with the activated trigger. If, at operation 216, a user input was not received, the embodiment continually monitors for user input until a relevant portion of the broadcast is finished. In particular, at operation 222, the embodiment determines if the portion of the broadcast is finished. If the broadcast is not finished, the embodiment returns to operation 216. If the broadcast has finished, the embodiment returns to operation 208 where an additional broadcast and broadcast trigger may be received. For example, in connection with an interactive advertisement that provides content that is supplemental to a broadcast advertisement, the interactive advertisement will only be enabled to run during the duration of the broadcast advertisement.

Figure 4:
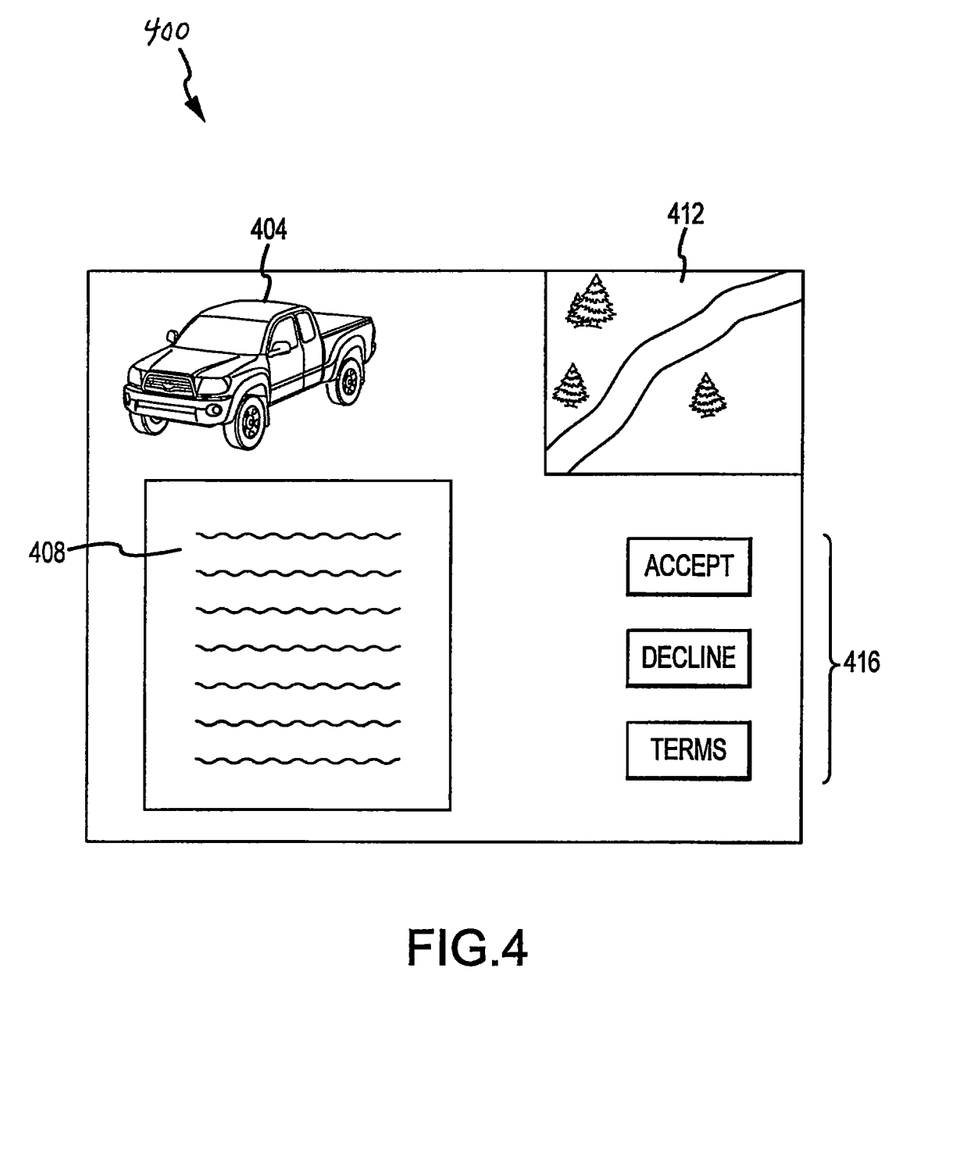
FIG. 4 is another screen shot taken of a display in accordance with embodiments of the present invention.

Referring again to operation 218, reference is made to FIG. 4, which shows a frame 400 of the display 136 during an execution of the interactive application 156a. Generally, the interactive application 156a displays additional or supplemental information regarding an item that is included in the standard broadcast. In connection with embodiments of the invention that are directed to advertising, the supplemental content may include additional information for items being advertised during a broadcast ad. The interactive prompt 308 will typically be displayed during the broadcast ad and the supplemental content will be provided to the user in response to a user selection of the prompt 308.

The content and the format of the displayed information will typically be provided through a mark-up language format file that is associated with the interactive application 156a. Industry standard formats such as extensible mark-up language (XML) and hypertext mark-up language (HTML) may be used to provide the content and formatting parameters for the interactive application 156a. Additionally, the interactive application 156a may include a graphic or image of the item that is being advertised. Portable Network Graphics (PNG) or other appropriate formats, such as for example, Tagged Image File Format (TIFF), Joint Photographic Experts Group (JPEG) or Raw Image File format (RAW) may be used to display the image. Moreover, video or moving picture images may be displayed by the interactive application 156a. In displaying a video image, an appropriate format, such as for example, any of the Moving Picture Experts Group (MPEG) formats.

FIG. 4 is a screen shot of a display 136 taken during the execution of the interactive application 156a. FIG. 4 includes an exemplary display of information and graphics in accordance with the embodiments of the present invention. As shown in FIG. 4, a portion of the display 136 may be dedicated to a graphic 404. Another section 408 of the display 136 may be dedicated to displaying text that provides further elaboration or information regarding the item that is illustrated in the graphic 404. As the interactive application 156a may run concurrently with the standard broadcast ad or other broadcast content, a window 412 of the display 136 may be dedicated to displaying a scaled version of the standard satellite broadcast. Alternatively, the video display may be paused during viewing of the interactive content/application. The interactive ad, which is one example of an interactive application, may include one or more buttons 416. The buttons 416 may be actuated or selected by a user through the operation of the remote 144 to instruct the interactive application 156 to carry out one or more predetermined actions. These predetermined actions may include, for example, accepting an offer to receive additional information regarding the advertised item, declining an offer to receive additional information, and displaying terms of an offer for promotional information. Additionally, a particular button 416 may be provided that allows the user to exit from the interactive advertisement and thereby return to the normal broadcast.

Referring again to FIG. 2, at operation 220, a determination is made as to whether the user has requested further information regarding an advertised or displayed item or service. This may include actuating or selecting one or more of the buttons 416 to thereby accept a promotional offer. At operation 224, if further information is requested, the receiver 108 sends a message to the service provider 104. This may include, for example, an operation of the processor 140 that initiates a message across the network 152 to the service provider 104.

If, at operation 220, no requests for further information is made, operation 228 may follow. At operation 228 a determination is made as to whether a user has elected to quit the interactive application 156a. If the user has indeed quit the interactive advertisement, operation 208 may follow wherein further broadcast content is again received. If the user has not quit the application at determination 228, operation 218 may follow wherein the interactive application 156a continues to run.

Figure 5:
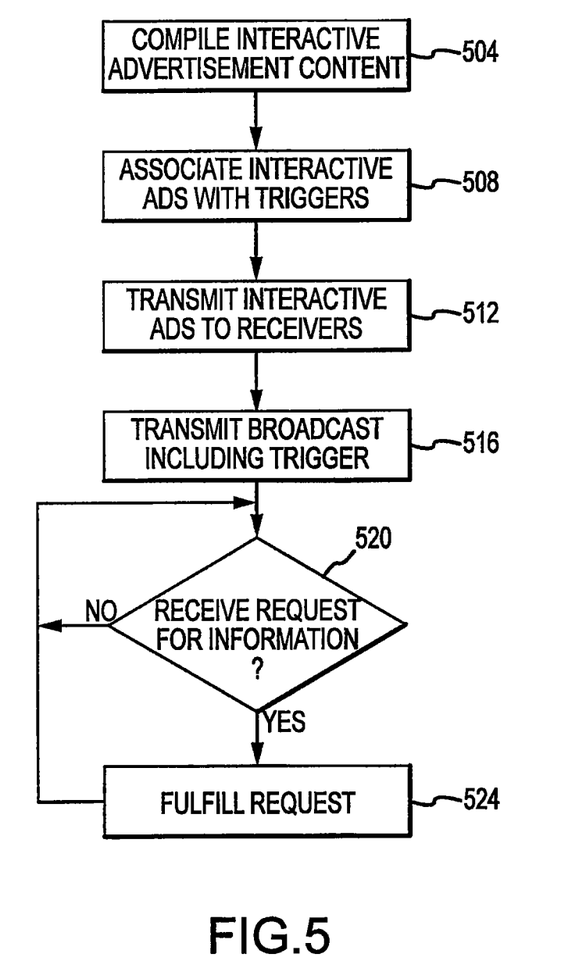
FIG. 5 is another flow chart illustrating a method in accordance with embodiments of the present invention.

FIG. 5 is a flow chart illustrating operations of a service provider in accordance with embodiments of the present invention. As mentioned above, the receiver 108 may receive one or more interactive applications 156a-n from the service provider 104. Accordingly, at the service provider 104, the interactive applications are assembled and packaged initially at operation 504. In an advertising context, the advertising content may be received from a variety of content providers. The various content providers may be vendors or service providers whose advertisements run via the broadcast service. The vendors and/or service providers may be provided with a suite of software tools that are operable to compile build a particular interactive advertisement in a standard format. In particular the text and formatting associated with the supplemental content may be included in a XML file and the graphic to be displayed can be formatted in an appropriate manner, such as in a PNG file.

In operation 508, each of the interactive advertisements 156a-n may be associated with a particular trigger. As described above, this may include assigning a unique identifier to each trigger and to the interactive application 156a-n associated the with trigger.

At operation 512, one or more interactive applications are sent from the service provider 104 to the receiver 108. As mentioned above this may include compressing the plurality of interactive applications 156a-n into a single compressed file prior to transmission via the satellite 116. Once the interactive applications 156a-n have been sent and received at the receiver 108, operation 516 may follow.

At operation 516, the service provider 104 broadcasts audio and/or visual content in a standard manner. In addition to the standard broadcast, operation 516 includes sending at least one trigger at an appropriate time during the broadcast such as during the VBI. The trigger is associated with a predetermined portion of the broadcast such as a particular broadcast ad. As described above, the trigger is adapted to run an interactive prompt during the predetermined portion of the broadcast, the prompt including a means for launching a particular interactive application 156a resident on the receiver 104.

At operation 520, a determination is made as to whether a request for information is received from the receiver 108. As mentioned above, this includes a message sent through the network connection 148, across the network 152, from the receiver 108 to the service provider 104.

If it is determined that the user has requested further information, operation 524 may follow. At operation 524, an order fulfillment process occurs. The order fulfillment process may include sending a request to a particular vendor or service provider. The request may include an address or other contact information for the user who provided the request for information. The vendor and/or service provider may then provide the user with additional information such as product brochures. The product brochures may be sent through known mechanisms such as the U.S. mail, e-mail, etc. Alternatively or in combination, information may be sent directly to the receiver 108. Information may be sent in digital form, such as for example, a web page or a link to a web page. As yet another option, the service provider may instruct the receiver to retrieve information from a third party source, such as an advertiser's website. Alternatively, the trigger button, and/or interactive ad itself, may contain such an instruction. If at operation 520, no request for information was received, the operation may continue to monitor for such additional or further requests.

In accordance with embodiments of the present invention, one or more of the interaction applications 156a-n resident on the receiver may have an expiration date. The expiration provides a time limit or date past which the interactive applications 156a-n will not be allowed to run. The expiration date may be needed to prevent old or out of date information from being displayed to a user. In an advertising context, a campaign may run for a predetermined time past which certain offers or other advertising content may no longer be valid. Accordingly, the method illustrated in FIG. 5 may additionally include associating one or interactive application with an expiration date.

Generally, it should be noted that alternative embodiments may display interactive content without requiring user selection of a trigger. Such embodiments may automatically display interactive content at certain intervals or when certain advertisements, or other initiators, occur. For example, advertisements that are demographically targeted may auto-initiate interactive content when the targeted advertisement is displayed to a user that is a member of the target demographic.

It should also be noted that the functionality of viewing, interacting with, and/or exiting interactive content may be provided during real-time viewing of an audiovisual program or video, delayed viewing (as when a real-time program is played back from a buffer, such as a pause buffer), and during playback of a recorded program or video. Thus, it can be appreciated that triggers may be recorded with an associated advertisement, video or program. It should also be appreciated that triggers may be associated with a program of any sort, including standard television programs, movies, electronic program guides or other programming, and not simply with advertisements.

The foregoing merely illustrates certain principles of the invention. Various modifications and alterations to the described embodiments will be apparent to those skilled in the art in view of the teachings herein. For example, although certain foregoing embodiments have been described with respect to interactive advertisements, it should be appreciated that any interactive content may be delivered, processed, accessed or otherwise utilized in any of the embodiments described herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention

What is claimed is:

1. A method of displaying interactive content, comprising:
receiving, at a receiver, an interactive application;

storing the interactive application on a storage device associated with the receiver;
receiving, at the receiver, a broadcast stream having a trigger including processor executable code for an interactive prompt, wherein the interactive application and the broadcast stream are received over a first communication path, the interactive application being received prior to the broadcast stream being received, and wherein the interactive application comprises supplemental content related to the broadcast content;
displaying the interactive prompt by executing the processor executable code from the broadcast stream, the interactive prompt being displayed concurrently with broadcast content of the broadcast stream;
determining whether a user has actuated the interactive prompt during the display of the interactive prompt;
if the user has actuated the interactive prompt:
in response to a user actuation of the interactive prompt, launching the interactive application;
displaying the supplemental content related to the broadcast content of the interactive application, the supplemental content featuring an item that is also featured in the broadcast content, the supplemental content including a second user prompt that, when chosen, causes a declination of an offer for further information about the item, the supplemental content including a third user prompt that, when chosen, causes a message to be sent from the receiver via a second communication path requesting additional information regarding the supplemental content;
if the user has not actuated the interactive prompt:
determining if a portion of the broadcast associated with the interactive prompt has finished, and if said portion of the broadcast has finished, discontinuing the display of the interactive prompt; determining if an expiration date for the interactive application has been reached, the expiration date provided by an advertiser and specifying a time limit past which the supplemental content in the interactive application will not be displayed and if the expiration date has been reached, deleting the interactive application from the storage device.

2. The method of claim 1, further comprising:
receiving and storing a plurality of interactive applications at the receiver; wherein the trigger includes a pointer uniquely identifying a particular interactive application.

3. The method of claim 2, wherein: the plurality of interactive applications are received as a compressed file, the method further comprising decompressing the file.

4. The method of claim 3, wherein the trigger consists of a computer executable code operable to launch the interactive prompt and a unique identifier that correlates the trigger with the interactive application, and wherein the trigger does not include any of the supplemental content.

5. The method of claim 4, further comprising pausing the broadcast content if the user actuates the interactive prompt.

6. The method of claim 5, wherein the supplemental content further includes a fourth user prompt that, when chosen, causes additional terms regarding the supplemental content to be displayed.

7. The method of claim 6, wherein the first communication path is a satellite broadcast and the second communication path is a local or wide area network.

8. The method of claim 7, wherein the broadcast stream having the trigger is saved into a video recorder of the receiver, and wherein the trigger causes the interactive application to launch at a time subsequent to when the trigger was broadcast and during a playback of the recorded broadcast content.

9. The method of claim 7, wherein the broadcast stream having the trigger is saved into a pause buffer of the receiver, and wherein the trigger causes the interactive application to launch at a time subsequent to when the trigger was broadcast and during a playback of the paused broadcast content.

10. The method of claim 1, wherein:
the supplemental content includes text providing information about the item.

11. The method of claim 1, wherein: the supplemental content includes a window having a scaled display of the content associated with the broadcast stream.

12. A receiver, comprising:
a tuner operable to receive a signal via a first communication path;
a decoder connected to the tuner and configured to decode the signal into a decoded signal, the decoded signal including at least one interactive application and a trigger including processor executable code for an interactive prompt, wherein the at least one interactive application is received prior to the trigger, wherein the at least one interactive application and the trigger are received via the first communication path;
a storage device connected to the decoder and configured to store the at least one interactive application; and
a processor connected to the storage device operable to execute the processor executable code form the decoded signal when the trigger is received in order to output the interactive prompt for display to a user, the processor further configured to execute the at least one interactive application in response to a user activation of the interactive prompt, wherein the trigger is received at the receiver during a broadcast received via the first communication path;
the processor further configured to display supplemental content related to the broadcast content of the interactive application, the supplemental content including a second user prompt that, when chosen, causes an exit from the supplemental content, the supplemental content including a third user prompt that, when chosen, causes a message to be sent from the receiver via a second communication path requesting additional information regarding the supplemental content; and
the processor further configured to determine if the user has not actuated the interactive prompt:
determining if a portion of the broadcast associated with the interactive prompt has finished, and if said portion of the broadcast has finished, discontinuing the display of the interactive prompt;
determining if an expiration date for the interactive application has been reached, the expiration date provided by an advertiser and specifying a time limit past which the interactive application is not allowed to run, and if the expiration date has been reached, to delete the interactive application from the storage device.

13. The receiver of claim 12, wherein the trigger includes a pointer that identifies the interactive application from among a plurality of other interactive applications.

14. The receiver of claim 12, wherein the interactive application is associated with an advertising campaign and the expiration date specifies a time past which offers in the advertising campaign are no longer valid.

* * * * *